Patented Feb. 28, 1933

1,899,426

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

AGE RESISTING VULCANIZED RUBBER PRODUCT

No Drawing.      Application filed November 8, 1929. Serial No. 405,842.

The present invention relates to the manufacture of a vulcanized rubber product by an improved process wherein there is employed in addition to the ordinary compounding ingredients, a new type of reaction product capable of imparting age resisting or antioxidant characteristics to the rubber product.

It is well known in the art to which this invention pertains that the use of certain organic compounds frequently is materially limited because of the fact that the presence of such compounds, or of their heat of decomposition or sulfur or other reaction products produced in the curing process, apparently cause or aid in causing, a relatively rapid deterioration of the vulcanized products. Such rubber products are said to age badly, that is, the rubber becomes hard and loses a large part of its resiliency, and other characteristics such as tensile strength, ultimate elongation and the like are detrimentally affected. It has now been found that the deterioration of a vulcanized rubber compound may be substantially decreased and the effective life of the product materially lengthened if there be added to the rubber compound, prior to vulcanization thereof, a member of a class of materials formed by reacting substantially equi-molecular proportions of an aryl hydroxide, an aliphatic amine and an aliphatic aldehyde.

The age resisting characteristics of a vulcanized rubber product can be readily ascertained by means of an accelerated aging test wherein samples of the vulcanized product are subjected in a bomb to the action of oxygen under pressure and maintained for several hours at an elevated temperature. The treated samples are then examined and tested and the results compared with similar results obtained by testing the unaged vulcanized stock. The deterioration in properties suffered as a result of the exposure to oxygen is indicative of the result that would normally be expected from that particular stock during service. Such a test is known as the Bierer-Davis aging test and produces an effect on a vulcanized rubber stock comparable with that resulting from several years of natural aging of the rubber.

The present invention will be readily understood from the following description and examples wherein a preferred mode of operating the invention is set forth.

One of the preferred class of compounds, for example, the reaction product of substantially equi-molecular proportions of phenol, diethylamine, and formaldehyde was prepared in the following manner:

Substantially 28.2 parts of phenol were dissolved in the required quantity of ethyl alcohol. Substantially 24.3 parts of 88% diethylamine were diluted with approximately 40 parts of water and added to the alcoholic phenol solution. To the mixture thus formed, substantially 22.5 parts of 40% formaldehyde solution were added and the mixture containing the three constituents refluxed for approximately five hours. The reaction product was dissolved in concentrated hydrochloric acid and then made strongly alkaline by adding an excess of an alkali, for example, sodium hydroxide solution. The light oil that separated out by this treatment was purified, preferably by distillation at a pressure lower than atmospheric pressure. The reaction whereby the material hereinbefore described is prepared is thought to be as follows:

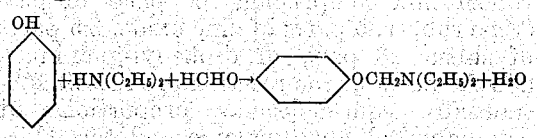

A sample of the reaction product prepared as described was incorporated in the well known manner in a rubber stock comprising, 100 parts of pale crêpe rubber, 5 parts of zinc oxide, 3.5 parts of sulfur, .8 parts of diphenyl-guanidine, and 2.0 parts of the reaction product of substantially equi-molecular proportions of phenol, formaldehyde and diethylamine.

The stock was then vulcanized by heating sheets of the stock in the usual manner for 30 and 45 minutes, respectively, in a press maintained at the temperature given by 40 pounds of steam pressure to the square inch (that is, 287° F.). Portions of the stock cured as set forth were then artificially aged by heating for 36 hours at 70° C. and under a pressure of 300 pounds of oxygen per square inch. The results obtained upon testing the aged and the unaged stocks are as follows:

Table I

| Time of cure | Hours aged | Modulus of elasticity in lbs/in² at elongations of | | | Tensile at break in lbs/in² | % Ultimate elongation |
|---|---|---|---|---|---|---|
| | | 300% | 500% | 700% | | |
| 30 mins. at 287° F | 0 | 167 | 425 | 1640 | 2860 | 800 |
| 30 mins. at 287° F | 36 | 177 | 471 | 1790 | 2670 | 770 |
| 45 mins. at 287° F | 0 | 210 | 620 | 2500 | 3545 | 760 |
| 45 mins. at 287° F | 36 | 214 | 708 | 2480 | 2890 | 735 |

From the data set forth in Table I it is seen that the reaction product of substantially equi-molecular proportions of phenol, diethylamine and formaldehyde constitutes an anti-oxidant possessing desirable properties.

Another example of the preferred class of compounds comprises a reaction product of substantially equi-molecular proportions of beta-naphthol, diethylamine and formaldehyde. This material was prepared in a manner analogous to that previously described by which the reaction product of phenol, formaldehyde and diethylamine was obtained. The reaction involved in the preparation of the reaction product of substantially equi-molecular proportions of beta-naphthol, formaldehyde and diethylamine, is most probably represented as follows:

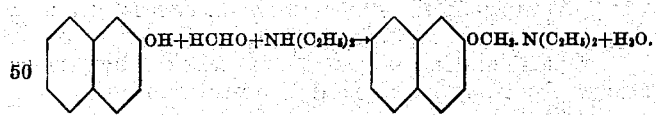

A sample of the material thus prepared was compounded in the usual manner in a rubber mix comprising, 100 parts of pale crêpe rubber, 5 parts of zinc oxide, 3.5 parts of sulfur, .8 parts of diphenyl-guanidine, and 2.0 parts of the reaction product of substantially equi-molecular proportions of beta-naphthol, diethylamine and formaldehyde.

The above stock was vulcanized by heating at 287° F. for 30 and 45 minutes in a press and the vulcanized stock was then aged by heating for 36 hours at 70° C. and under a pressure of 300 pounds of oxygen per square inch. The results obtained by testing the aged and unaged stocks follow:

Table II

| Time of cure | Hours aged | Modulus of elasticity in lbs/in² at elongations of | | | Tensile at break in lbs/in² | % Ultimate elongation |
|---|---|---|---|---|---|---|
| | | 300% | 500% | 700% | | |
| 30 mins. at 287° F | 0 | 120 | 255 | 882 | 2360 | 880 |
| 30 mins. at 287° F | 36 | 103 | 269 | 888 | 1530 | 800 |
| 45 mins. at 287° F | 0 | 167 | 385 | 1480 | 2540 | 790 |
| 45 mins. at 287° F | 36 | 163 | 462 | 1485 | 2035 | 750 |

From the data disclosed in Table II it is apparent that a rubber stock in which there is incorporated prior to vulcanization a reaction product of substantially equi-molecular proportions of an aryl hydroxide, an aliphatic amine and an aliphatic aldehyde, specifically a reaction product of substantially equi-molecular proportions of beta-naphthol, formaldehyde and diethylamine, retains to a large extent its original unaged characteristics. It is well known that a rubber stock containing the ingredients specified in the foregoing example with the exception that no anti-oxidant was employed melts down to a shapeless mass incapable of test when subjected to the artificial aging test as described.

Other types of the preferred class of compounds, for example, the reaction product of substantially equi-molecular proportions of an aryl hydroxide, as for example phenol, alpha and beta-naphthol, cresol and the like, an aliphatic amine, such as methyl amine, ethylamine, dimethylamine, diethylamine and analogous compounds and an aliphatic aldehyde such as formaldehyde, acetaldehyde, crotonaldehyde, butylaldehyde and similar aldehydes may be employed as anti-oxidants in a rubber mix of vulcanization characteristics.

The various examples hereinbefore set forth in detail are to be understood as illustrative only and not at all limitative of the scope of the invention. Other compounding ingredients and other proportions of ingredients than those indicated in the various examples may be employed in the manufacture of various types of vulcanized rubber products as is well known to those skilled in the art to which the invention pertains. The invention is to be understood as limited solely by the claims attached hereto as a part of this specification, wherein the invention is claimed as broadly as is possible in view of the prior art.

What is claimed is:

1. The process of manufacturing a vulcanized rubber product possessing age resisting characteristics which comprises heating rubber and sulfur in the presence of an antioxidant comprising a reaction product of substantially equi-molecular proportions of a mono-hydroxy substituted aromatic hydrocarbon, a straight chain aliphatic secondary amine containing less than five carbon atoms and a saturated aliphatic aldehyde.

2. The process of manufacturing a vulcanized rubber product possessing age resisting characteristics which comprises heating rubber and sulfur in the presence of an antioxidant comprising a reaction product of substantially equi-molecular proportions of a mono hydroxy substituted aromatic hydrocarbon, a secondary aliphatic amine containing less than five carbon atoms, and a saturated aliphatic aldehyde.

3. The process of manufacturing a vulcanized rubber product possessing age resisting charactristics which comprises heating rubber and sulfur in the presence of an antioxidant comprising a reaction product of substantially equi-molecular proportions of phenol, a straight chain secondary aliphatic amine containing less than five carbon atoms and a saturated aliphatic aldehyde.

4. The process of manufacturing a vulcanized rubber product possessing age resisting characteristics which comprises heating rubber and sulfur in the presence of an antioxidant comprising a reaction product of substantially equi-molecular proportions of phenol, diethylamine and formaldehyde.

5. An age resisting rubber product comprising the vulcanization product of a rubber stock containing prior to the vulcanization of said stock a reaction product of substantially equi-molecular proportions of a monohydroxy substituted aromatic hydrocarbon, a straight chain aliphatic secondary amine containing less than five carbon atoms and a saturated aliphatic aldehyde.

6. An age resisting rubber product comprising the vulcanization product of a rubber stock containing prior to the vulcanization of said stock a reaction product of substantially equi-molecular proportions of a mono hydroxy substituted aromatic hydrocarbon, a saturated aliphatic secondary amine containing less than five carbon atoms and a saturated aliphatic aldehyde.

7. An age resisting rubber product comprising the vulcanization product of a rubber stock containing prior to the vulcanization of said stock a reaction product of substantially equi-molecular proportions of phenol, a straight chain secondary aliphatic amine containing less than five carbon atoms and a saturated aliphatic aldehyde.

8. An age resisting rubber product comprising the vulcanization product of a rubber stock containing prior to the vulcanization of said stock a reaction product of substantially equi-molecular proportions of a mono hydroxy substituted aromatic hydrocarbon, a secondary aliphatic amine containing less than five carbon atoms and formaldehyde.

9. An age resisting rubber product comprising the vulcanization product of a rubber stock containing prior to the vulcanization of said stock a reaction product of substantially equi-molecular proportions of phenol, diethylamine and formaldehyde.

In testimony whereof I hereunto affix my signature.

WINFIELD SCOTT.

DISCLAIMER 1,899,426.—*Winfield Scott*, Nitro, W. Va. AGE RESISTING VULCANIZED RUBBER PRODUCT. Patent dated February 28, 1933. Disclaimer filed May 31, 1935, by the assignee, *The Rubber Service Laboratories Company*.

Hereby disclaims that part of the claim in said specification which appears therein as claims 1, 2, 5, 6, and 8.

Your petitioner further says that the subject matter not herein and hereby disclaimed is definitely distinguishable from the part or parts disclaimed herein and is truly and justly the invention of said Winfield Scott and is a material and substantial part of the thing patented.

[*Official Gazette June 18, 1935.*]